US006216574B1

(12) United States Patent
Hain

(10) Patent No.: US 6,216,574 B1
(45) Date of Patent: Apr. 17, 2001

(54) AUTOMATED STOP POSITIONING SYSTEM APPARATUS

(76) Inventor: Leonard Hain, P.O. Box 238, Rescue, CA (US) 95672

( * ) Notice: Subject to any disclaimer, the term of this patent is extended or adjusted under 35 U.S.C. 154(b) by 0 days.

(21) Appl. No.: 09/017,527

(22) Filed: Feb. 2, 1998

(51) Int. Cl.[7] .................................. B26D 5/24; B23Q 3/18
(52) U.S. Cl. ........................... 83/241; 83/268; 83/393; 83/468; 83/468.7; 83/522.21
(58) Field of Search .................................. 269/320, 291, 269/909; 83/62, 247, 268, 391, 393, 468, 468.7, 467.1, 953, 522.21, 522.19, 522.18, 522.17, 241

(56) References Cited

U.S. PATENT DOCUMENTS

| | | | |
|---|---|---|---|
| 2,838,078 | * 6/1958 | Cusanza | 83/468 |
| 3,304,824 | * 2/1967 | Hess, Sr. et al. | 83/468 X |
| 3,811,353 | * 5/1974 | Miles | 83/268 X |
| 3,910,142 | * 10/1975 | Jureit et al. | 83/268 X |
| 4,175,458 | * 11/1979 | Paris, Jr. et al. | 83/268 |
| 4,412,468 | * 11/1983 | Bucy | 83/468 |
| 5,040,443 | * 8/1991 | Price | 83/468 |
| 5,134,914 | * 8/1992 | Morosini | 83/468.7 X |
| 5,144,994 | * 9/1992 | Stecker, Sr. | 83/467.1 X |

OTHER PUBLICATIONS

"Turntable Cutting System", Speed Cut, Inc., date unknown, entire brochure (4 pages).

* cited by examiner

Primary Examiner—Charles Goodman
(74) Attorney, Agent, or Firm—Bernard Kreten

(57) ABSTRACT

Disclosed is an apparatus for precisely, easily and automatically setting and resetting stops on a cutting table. In particular, a hand manipulable pointer slideable along a scale may be moved a desired and equal distance to that desired of the stops, and the stops will automatically move that same distance and direction. The system is accomplished by operatively coupling the stops and the pointer system to a linear actuator. Also disclosed is an electromechanical braking system of superior quality for this apparatus.

11 Claims, 7 Drawing Sheets

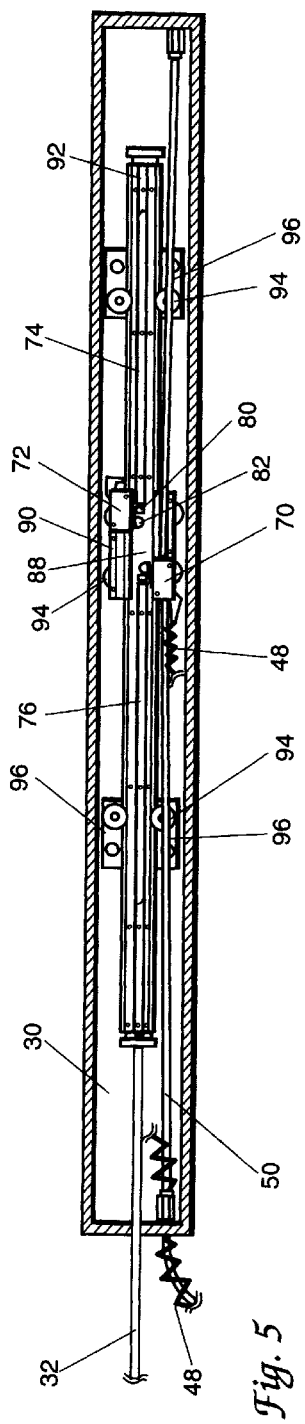
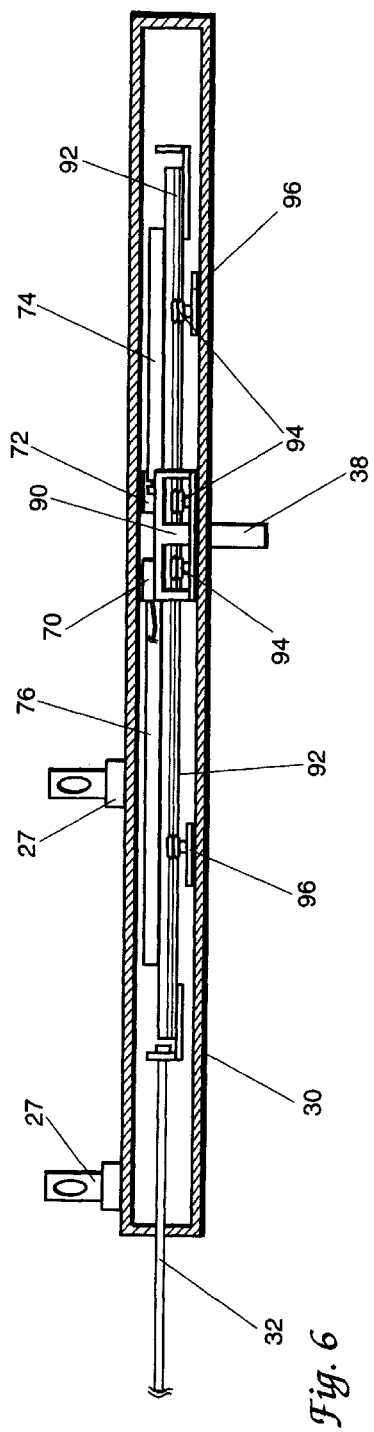
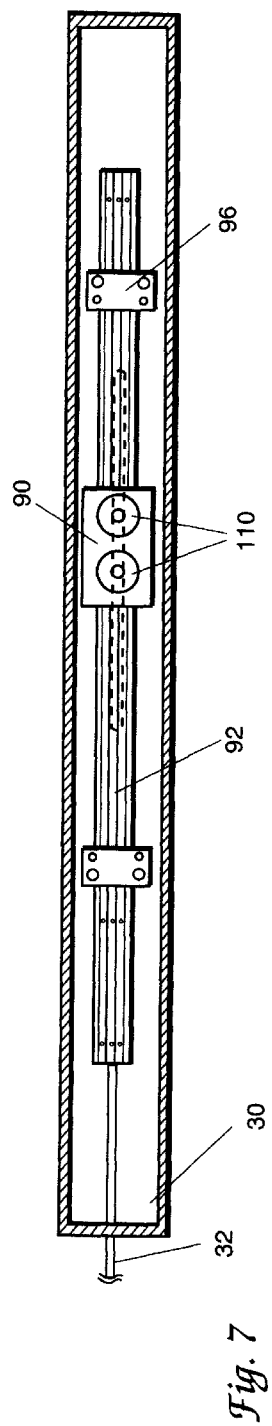

AUTOMATED STOP POSITIONING SYSTEM APPARATUS

FIELD OF THE INVENTION

The field of this invention relates generally to automated cutting or sawing systems. In particular, the field of this invention relates to automated precision metering means or stop manipulation for a tabletop cutting system.

BACKGROUND OF THE INVENTION

Cutting systems such as that depicted in FIG. 2 (prior art) have been around for some time, as gleaned from the Speed Cut, Inc. brochure. However, advances in the stop positioning systems of such cutting systems have been limited. There are numerous drawbacks to prior art metering or stop positioning systems such as that depicted in FIG. 2. For instance, the time it takes to manually change a desired length of a cut from, say, one foot, six inches to one foot, eight inches, or five feet, six inches to five feet, eight inches, is limited by the dexterity of the user of the apparatus vis-a-vis crank C and handle H. Certainly, as can be seen in large scale operations, time lost in repositioning a system such as this over the course of high usage results in unnecessary labor costs.

Another drawback of the prior art system of FIG. 2 is that, upon repeated use wherein workpieces are forcefully pushed against the stops S, the stops S tend to creep from their desired position to an undesired position, resulting in undesired cutting lengths. This is true of such prior art devices even if a brake is employed because prior art brakes have been inadequate for repeated, rough treatment from users. Of course, this also results in having to readjust the stop position from time to time due to the movement of the stop positions. Corollarily, this also results in a user having to check those stop positions periodically to ensure that they are accurately set. Again, this results in a serious waste of labor, time and money over the long haul.

Again, where we are considering a system such as that depicted in FIG. 2, we are looking at an industrial or shop setting wherein that system is intended for high volume usage. By further automating wood or metal cutting or other workpiece cutting as it relates to such a tabletop cutting apparatus, certain efficiencies can be achieved which the prior art is incapable of at the present.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

OTHER PRIOR ART (Including Author, Title, Date, Pertinent Pages, Etc.) "Turntable Cutting System", Speed Cut, Inc., date unknown, entire brochure (4 pages).

SUMMARY OF THE INVENTION

Generally speaking, the instant invention is an automated precision metering means for defining workpiece cut lengths. A plurality of spaced stops may be precisely relocated by a linear electric motor means by merely repositioning a pointer on a scale. Correspondingly, the distance displaced by the pointer on the scale will be the resulting equal distance of displacement of the linear motor means and therefore the stops. This is accomplished via a closed-loop circuit design which causes motor action that follows, precisely, pointer displacement. That is, a two inch movement of the pointer on a scale by the hand of a user (really the touch of a finger) will result in a guide rail, and therefore all stops attached thereto, to move that same distance in that same direction.

Additionally, a braking system is likewise disclosed so that once a desired position for the stops is located, that position is held fast; this is so even after repeated workpiece collisions with the stops. An electromechanical braking system is capable of withstanding forces in excess of those commonly experienced for such an apparatus (i.e., slamming workpieces into stops).

OBJECTS OF THE INVENTION

The primary object of the present invention is to automate the process of relocating the stop positions for a predetermined length cutting apparatus.

Another overall object of the present invention is to provide such an automated system wherein, once the stops are relocated to a desired position, the stops remain fixed in their position until relocation is again desired.

It is another object of the present invention to provide an automated stop relocation system.

It is another object of the present invention to utilize a linear motorized means to relocate stops.

It is another object of the present invention to use an electric braking system to prevent the stops of the present invention from dislocating from desired points.

It is another object of the present invention to provide a precise metering system whereby displacement is accomplished by sliding a pointer on a scale.

Viewed from a first vantage point, it is an object of the present invention to provide a cutting apparatus, comprising, in combination, a saw, a table extending from and beneath the saw, a plurality of workpiece abutment means extending upwardly and outwardly from a top surface of the table, means for automatically repositioning the stops, the automatic repositioning means operatively coupled to the stops.

Viewed from a second vantage point, it is an object of the present invention to provide a method for precisely specifying the length of a cut for a workpiece on a table saw, the steps comprising, in combination, orienting a pointer on a scale in the direction and distance desired for a cut length change, driving a guide having a plurality of spaced stops thereon correlative to the orientation of the pointer.

Viewed from a third vantage point, it is an object of the present invention to provide a table saw automatic stop adjustment kit, comprising, in combination, guide rail means coupleable to the table, a plurality of stops coupled to the guide, electromechanical reorientation means operatively coupled to the guide for adjusting the stops on the table.

These and other objects will be made manifest when considering the following detailed specification when taken in conjunction with the appended drawing figures.

BRIEF DESCRIPTION OF THE DRAWINGS

FIG. 5 is a top view of the rail and gantry system of the instant invention.

FIG. 6 is a side view of the rail and gantry system of the instant invention.

FIG. 7 is a bottom view of the rail and gantry system of the instant invention.

DESCRIPTION OF PREFERRED EMBODIMENTS

Figure 1:
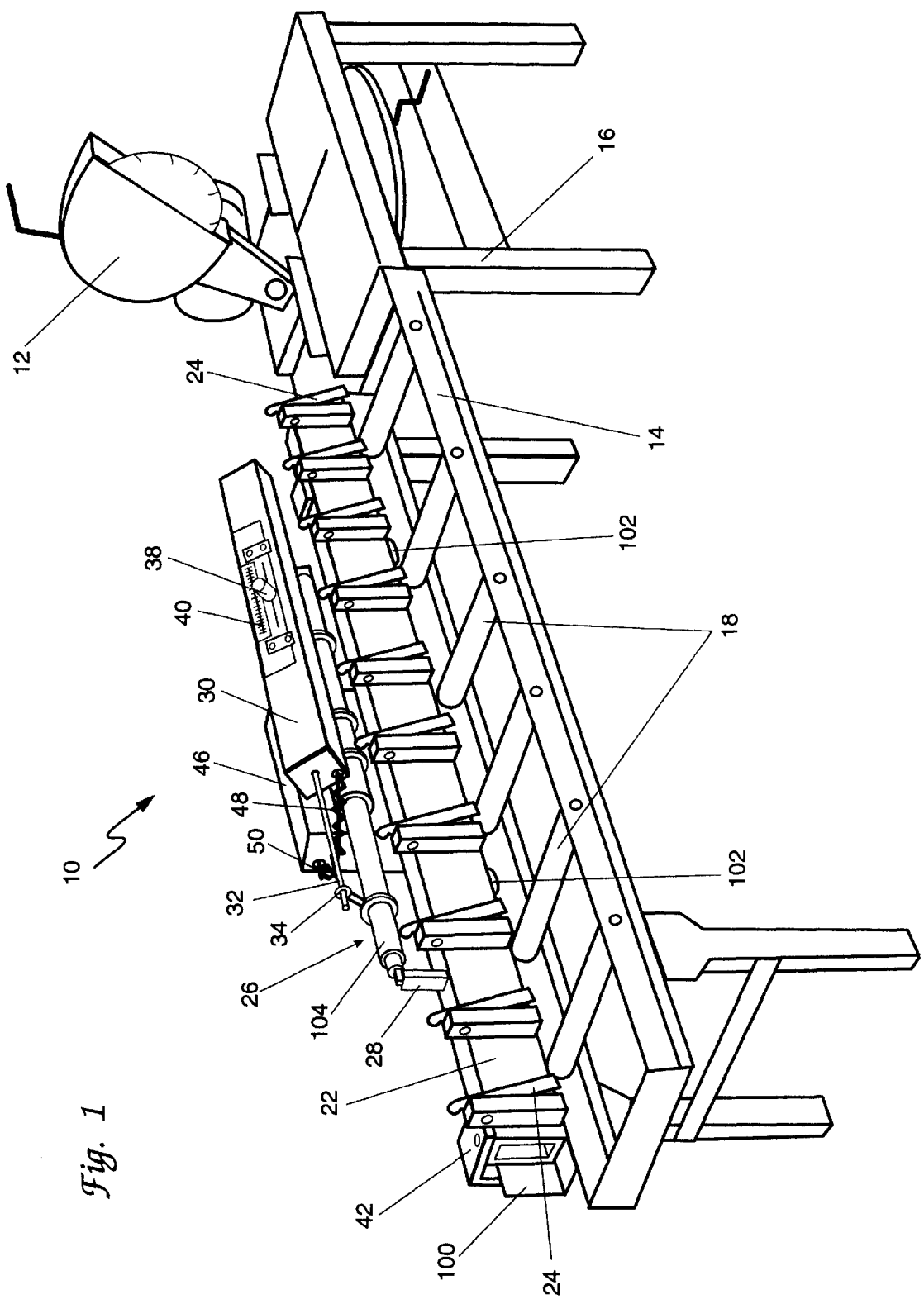
FIG. 1 is a perspective view of a tabletop cutting apparatus of the instant invention.
Figure 2:
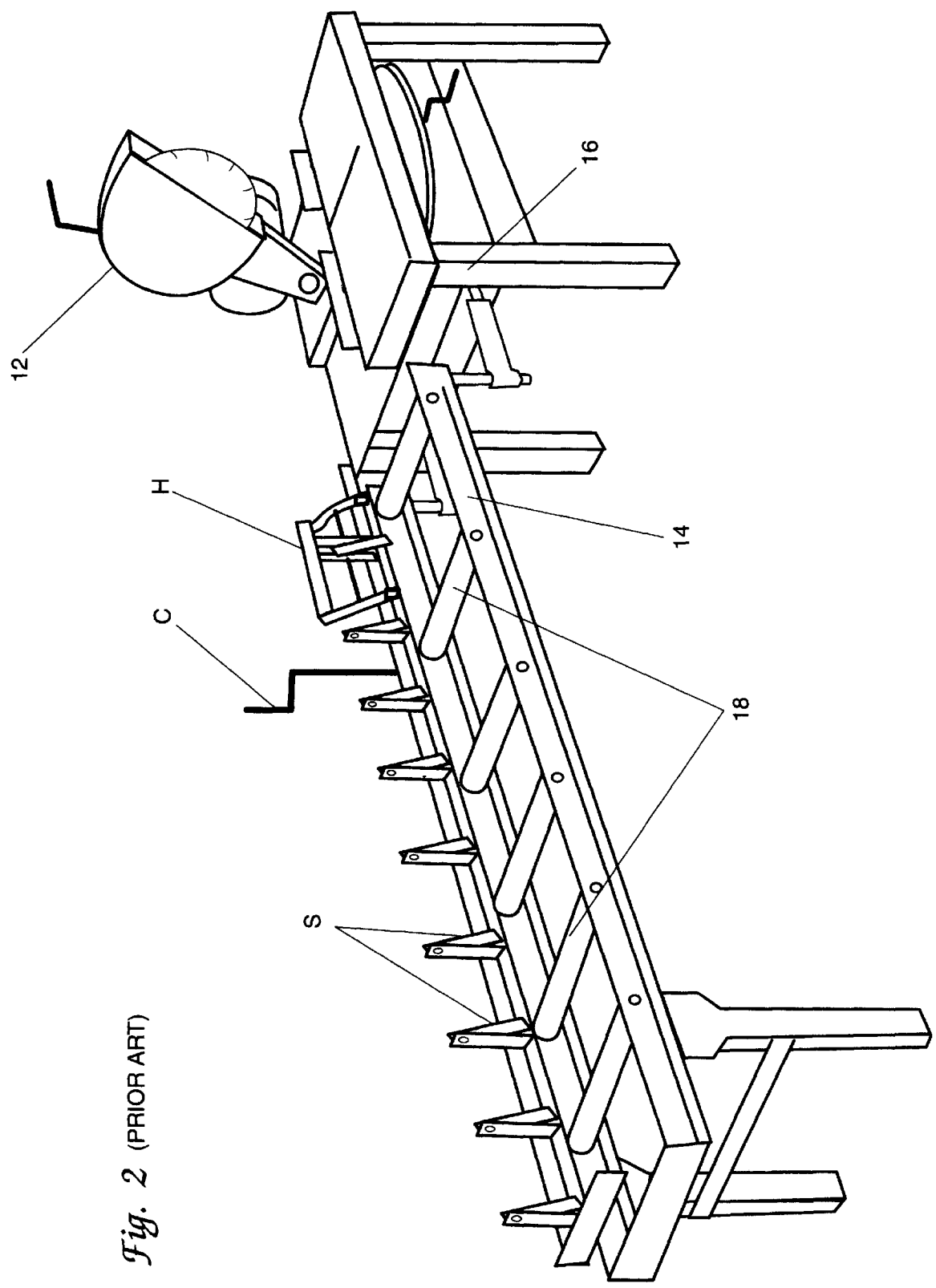
FIG. 2 is a prior art tabletop cutting apparatus.

Considering the drawings, wherein like reference numerals denote like parts throughout the various drawing Figures, reference numeral 10 is directed to the automated stop positioning system according to the present invention.

Generally speaking, the instant invention consists of the following components: a pivotable saw 12; a table 14; a guide 22 having stops 24 thereon; a linear actuator 26; a motor 44; an electromechanical brake 106; a power source 108; and a user positioning interface 30 having switches 70, 72 operatively coupled therein. Although these are the general components of the instant invention, details and interrelations of these components will be described hereinbelow. Although the workpieces for the cutting system may be wooden planks or metal, the following will generally describe the table associated with such a system for any such workpieces.

Referring now to FIG. 1, a table 14 is supported by legs 16 having a pivotable saw 12 at one end thereof. Although the workpiece support surface is to the left of the saw 12, this invention works equally well with a right hand system. Rollers 18 spaced and interposed upon table 14 allow a workpiece to be positioned along and atop table 14 in abutment with any of stops 24. By positioning a workpiece along the table 14 and beneath the saw 12, the workpiece is in a position to be cut. When a user, however, wishes to make repeated and equal cuts of workpieces on such a table 14, it is desirable to have some form of a jam, such as a stop 24, to abut against the workpiece. A plurality of stops 24, such as depicted in FIG. 1, is preferable, so that the stops 24 may be equally spaced, by, for example, one foot, so that various lengths can be readily chosen. Of course, the stops 24 must be in a fixed, non-slipping, position to allow multiple equal cuts to be made. However, it is also desirable to freely and readily relocate the position of such stops 24 for a next or other set of precisely metered cuts.

Figure 3:
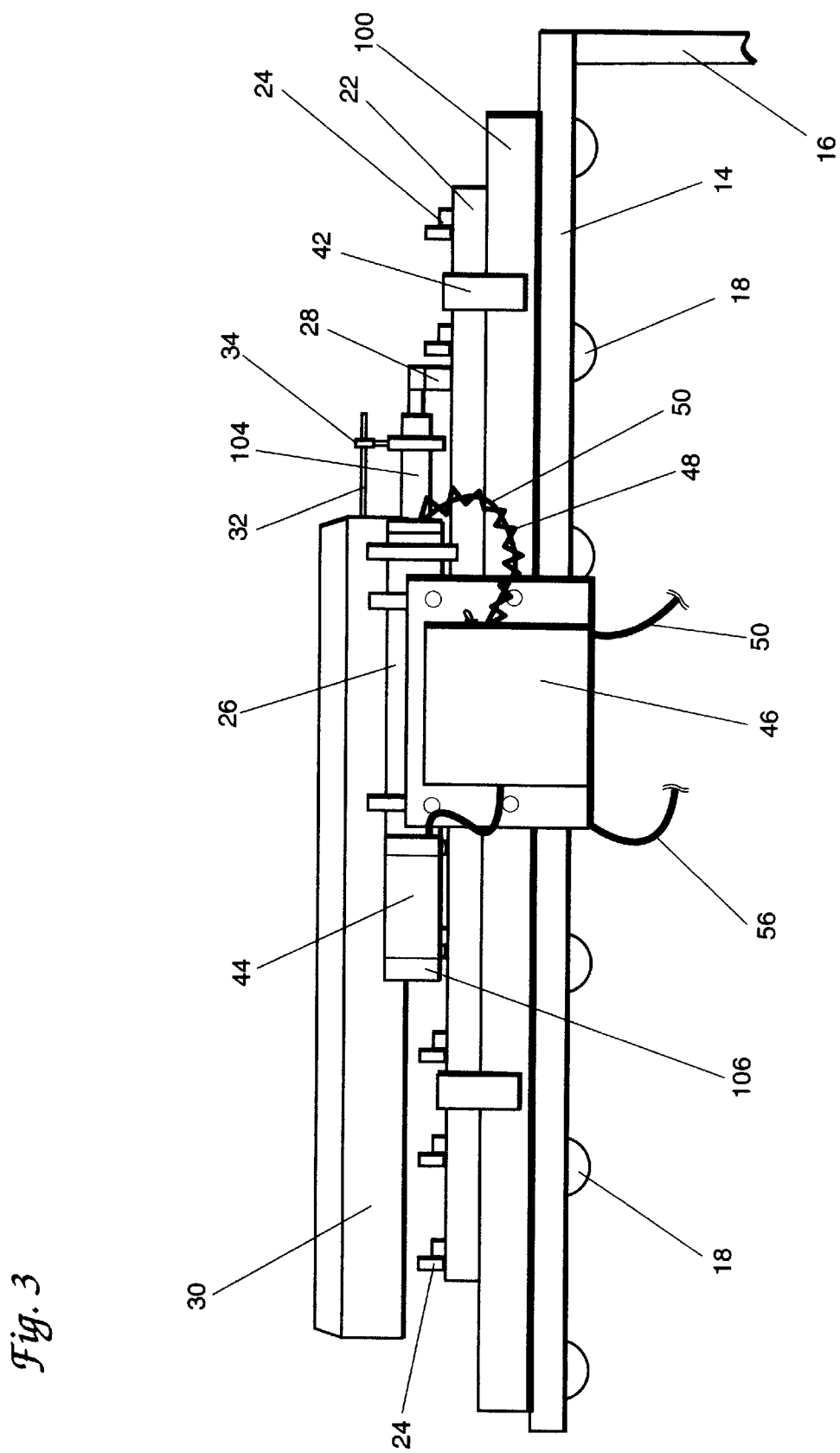
FIG. 3 is a backside view of the tabletop cutting apparatus depicting the metering means components.
Figure 4:
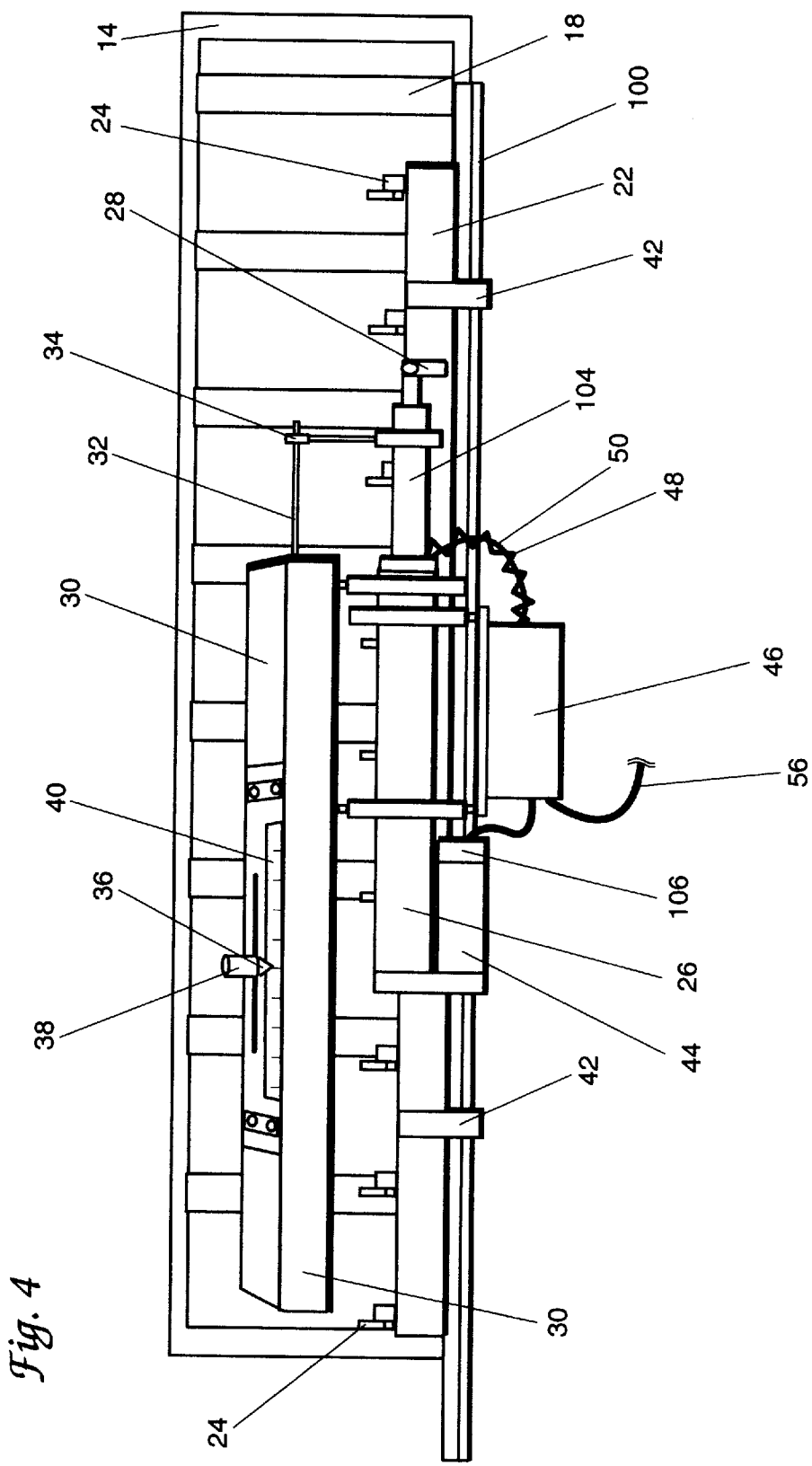
FIG. 4 is a top view of that which is shown in FIG. 3.

Referring now also to FIGS. 3 and 4, to that end, stops 24 are provided in a pivotally coupleable relationship to guide rail 22. However, in the instant invention, the guide rail 22 is not itself affixed to table 14. Instead, an L-shaped support 100 is coupled to table 14 and guide rail 22 rests upon slider pads 102 (preferably plastic disks) in a low frictional engagement with L-shaped support 100 by means of guide mounts 42 which are also L-shaped. Slider pads 102 are fastened to the L-shaped support 100. Guide mounts 42 are fastened on one side to guide rail 22 and are in low frictional engagement with the back side of L-shaped support 100 via slider pads 102. These low friction slider pads allow the guide rail 22 to slide back and forth as required in a low friction environment with a low level of initial force required.

To move the guide rail 22 back and forth, the guide rail is coupled to a linear motor means or linear actuator 26 by a rod- or bar-shaped coupling 28. Linear electric motors are very much like rotary electric motors, but while a rotary motor uses forces to twist a rotor around in a circle, a linear motor uses forces to push a carriage or rod along a track or tube. The linear actuator 26 as depicted in the drawing figures is a telescoping linear actuator wherein a rod arm 104 extends from a sleeve or retracts into the sleeve. A variety of linear actuators may be utilized for this purpose, however, a linear actuator having a 12 inch to 36 inch stroke of the rod arm is preferred, and 18 inches is most preferred. The linear actuator also preferably can accommodate at least a 250 pound load and most preferably can accommodate a 500 pound load. By forward or reverse pulsing of motor 44 (by, for instance, a switching means described in more detail hereinafter below), which is operatively coupled to the linear actuator 26, the linear actuator will likewise either retract or extend while a current is pulsing therethrough as will now be evident to those having ordinary skill in the art, informed by the present disclosure.

In physical relationship to the tabletop of the apparatus described hereinabove, the linear actuator 26 is coupled to a circuit box 46 which is itself coupled to both L-shaped support 100 and table 14. The coupling between the circuit box and the actuator 26 includes a fastener and a spacer to so locate the actuator 26 in space in substantially axial or parallel alignment with guide rail 22. Circuit box 46 is a housing for containing ancillary circuit components and power cables 56. Also both mechanically and operatively coupled to the linear actuator 26 is a rectangular box 30, which is the effective user interface for movement of the actuator 26 in a desired direction by a user. The details of that operation will follow below.

The rectangular box 30 is coupled to and positioned from linear actuator 26 by means of fasteners 27 (FIG. 6) project the rectangular box in space at a height at which an average user could both view the face of box 30 and manipulate it by hand. On the face of box 30, in sight of a user of the invention, is a scale 40 and a knob 38 having a pointer 36 thereon in pointing relationship to scale 40. Scale 40 can be of a multitude of scale varieties depending on the preference of a user, and is interchangeable at any time by a user with another scale. A foot-and-inch scale, although preferred, is not necessarily required. A left or right handed scale 40 is provided depending on whether table 14 projects from the left or right of the saw 12. As long as a user can discern, by means of the pointer 36 and its relationship to the scale 40, the desired distance by which that user wishes to move the guide rail 22 in a desired direction, precise movement of guide 22 may be accomplished.

Internal to the box 30 is a rail and gantry system. The components of this system are best viewed in FIGS. 5 through 8. In particular, the rail and gantry system is composed of a rail 92 that is engageable with bearing means, preferably V-shaped bearings, 94, though other bearing means are available to perform this task. Rail 92 is complimentarily formed to so receive V-shaped bearings 94 or other bearings as necessary. It is intended that a gantry or carrier 90 be slideably coupled to the rail 92 by means of the rail bearings 94 so that the gantry or carrier 90 can travel freely (low friction) along the rail 92. To hold the rail 92 in place, but also allow it to travel within box 30, are provided slideable rail mounts 96 which are coupled along with box 30 to linear actuator 26 as described above. Slideable rail mounts 96 also include a pair of V-shaped bearings 94 to so allow free travel of rail 92 thereby.

Figure 8:
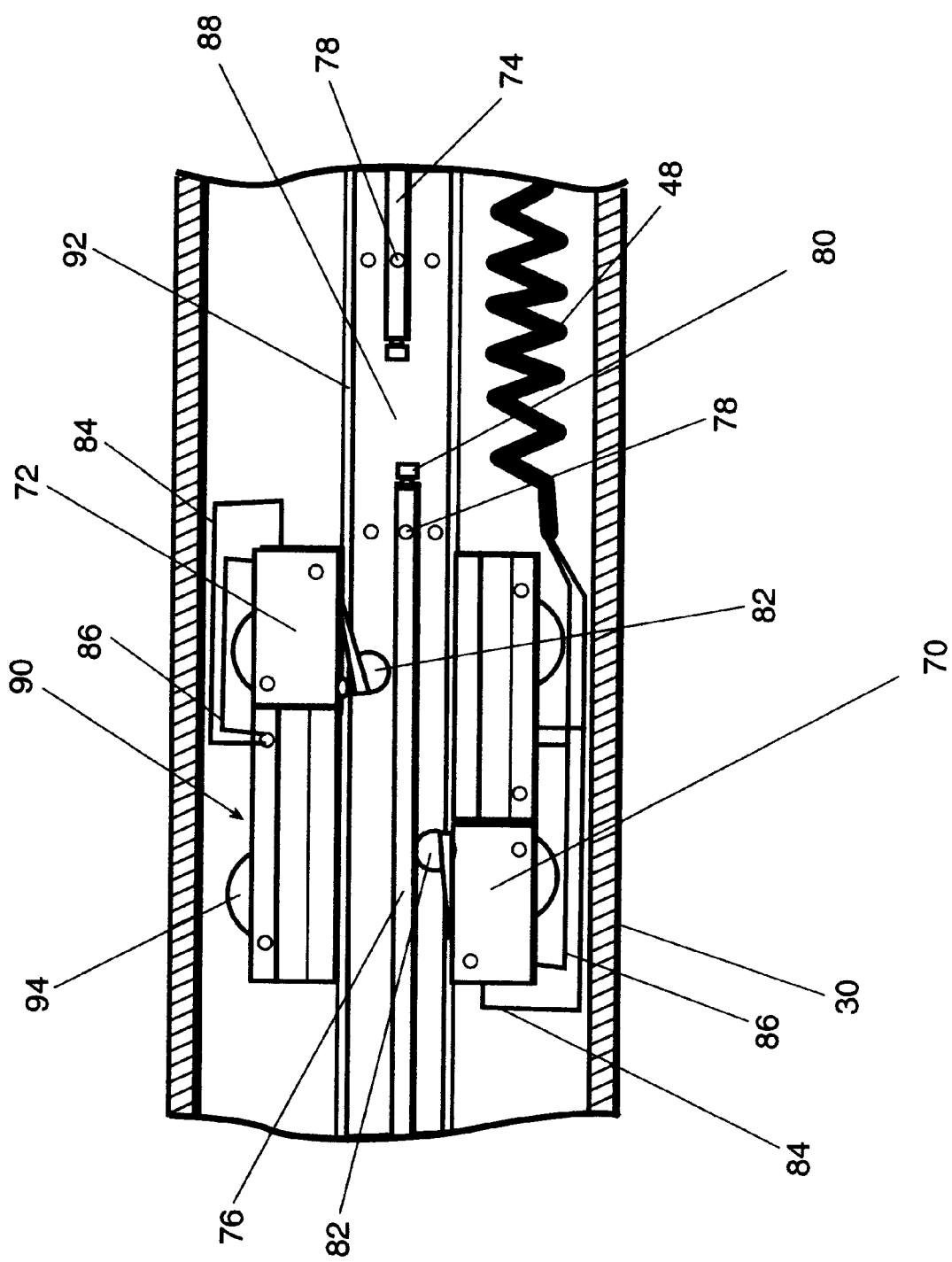
FIG. 8 is an enlarged view of the gantry on the rail with one switch in a closed position.

Carried on the carrier or gantry 90 will be two switching means, or microswitches 70 and 72, preferably operatively coupled to relays and transformer within circuit box 46 as will be evident to those having ordinary skill in the art, informed by the present disclosure. Also mounted on the rail 92 are a right cam guide 74 and a left cam guide 76 (fastened thereto with cam fasteners 78) which are provided to operatively interact with microswitches 70, 72. Although the left and right cam guides 76 and 74 are substantially running through a center line of the rail, they are actually offset from each other slightly, so that they can operatively engage with microswitches 70 and 72, respectively. More particularly, each of those microswitches 70 and 72 has a biased contact 82 in close proximity with or contacting right and left cam guides 74 and 76. The slight displacement of the cam guides 74, 76 vis-a-vis each other is substantially equal to the throw of the switch contacts 82. That is, as shown in FIG. 8, left cam guide 76 is spaced such that it will operatively engage or close switch 70, but cannot engage switch 72 and hence switch 72 stays in an open position when traveling by cam guide 76. The same is true in a mirrored relationship for right cam guide 74 and switch 72.

A space is also provided between the cam guides substantially equal to the distance between the biased contacts 82 of the respective left and right microswitches 70 and 72 when considered axially along rail 92. That space is adjustable by means of an adjustment screw 80 so that the desired space can be tuned precisely. When the biased contacts 82 of the respective microswitches 70 and 72 are in the open area 88, a rest position is attained wherein the biased contacts are extended and cause the switches 70, 72 to be open. Conversely, if the gantry 90 is moved to the right (of FIG. 8), for instance, microswitch 72 and its biased contact 82 will come into contact with cam 74, causing the switch to close. However, microswitch 70 and its corresponding biased contact 82 will not contact cam 74 due to the slight offset of the cams mentioned hereinabove. As the cams and microswitches are in a mirrored symmetric relationship left to right on the rail, the same is true if we were to take the gantry along the rail to the left.

As can also be seen in FIGS. 5 through 8, each microswitch 70 and 72 has a pulse terminal 84 and a ground terminal 86 and corresponding wires running therefrom through a preferably coiled cable 48 as depicted therein and running out from box 30 to circuit box 46. Also preferably running within the center core of coiled cable 48 is air hose 50 which also runs back to circuit box 46 and is coupled to an air supply which allows constant air displacement within box 30 to prevent debris from settling therein.

In actuality, the gantry 90 moves relative to the rail 92 in use, and the rail 92 also moves relative to the gantry 90. This will now be described. At the end of a cam 76 is a rod 32 coupled thereto and extending therefrom and outward from box 30. That rod is coupled to the rod arm 104 of linear actuator 26 by a rod coupling means 34. Therefore, as is now apparent, as the linear actuator rod arm 104 extends and retracts from within the linear actuator 26, likewise the rod 32 will move the rail 92 left and right with respect to slideable rail mounts 96. Box 30 also contains an elongated cavity below scale 40. Knob 38 extends into and through that cavity and is coupled to gantry 90 (FIGS. 6 and 7) at fastening holes 110 so that when the knob 38 is moved left or right, the gantry 90 likewise moves left or right along the rail 92.

As now can be understood, in use and operation, when a user wishes to adjust the position of the plurality of stops 24, a user by hand will grasp knob 38 and move it the desired number of inches or metered position left or right along scale 40, thereby engaging the left or right microswitch 70 or 72, which are operatively coupled, each in opposite polarity to motor 44, causing motor 44 to likewise pulse forward or reverse, which as described above will cause linear actuator 26 to extend or retract in the desired direction for the desired distance. The desired distance is accomplished by the following. When the gantry 90 is moved by moving the knob 38, say to the left one inch, microswitch 70 will close due to its biased contact 82 engaging cam guide 76. Thereafter, while that microswitch is in a closed position, current will continue to run to motor 44 until linear actuator 26 pulls rod 32 and hence rail 92 left one inch, thereby causing microswitch 70 to open and stop current from flowing when its biased contact 82 falls into opening or rest area 88. One might describe this type of electromechanical circuitry as an electromechanical, closed-loop following system due to the initial movement of the pointer and thereafter the system following to the location of the pointer.

As indicated hereinabove, an electromechanical braking system or solenoid 106 (FIGS. 3, 4 and 9) is also provided. Solenoid 106 is operatively coupled between a power source 108, switches 70, 72, and motor 44. The solenoid brake 106 is operatively coupled so that when current is not flowing through the solenoid, braking action is applied to motor 44, as will now be evident to those having ordinary skill in the art, informed by the present disclosure. Such electromechanical braking systems are capable of withstanding great forces, depending on the solenoid chosen. This effect is desired to the extent that it would be anticipated that users of this apparatus will have a tendency to force workpieces against stops 24 in a repeated fashion, due to the nature of the work involved. Therefore, such a strong braking system is desired to prevent any creeping or dislocation of stops 24 and/or guide rail 22.

Figure 9:
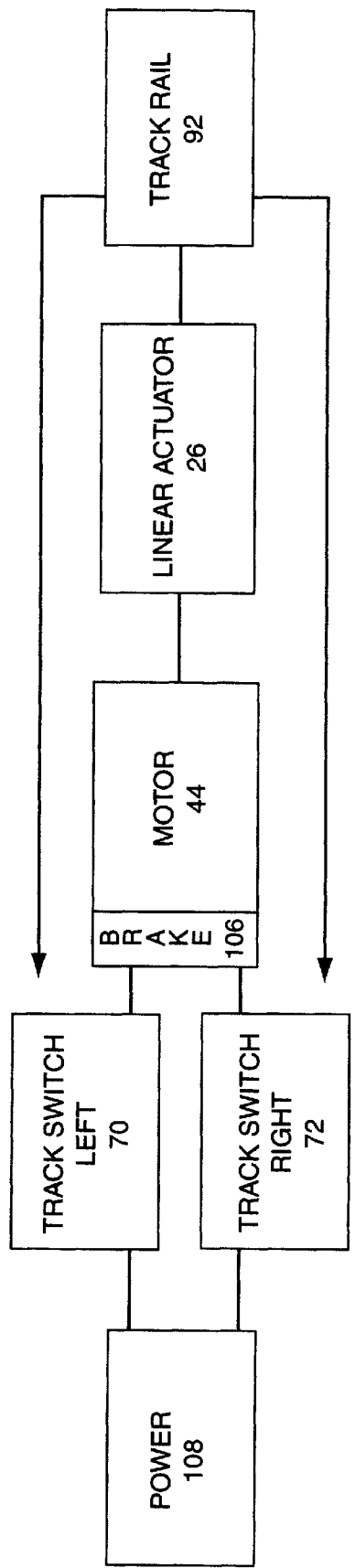
FIG. 9 is a schematic of the instant invention.

The system described hereinabove is depicted schematically in FIG. 9. In particular, as depicted in FIG. 9, a power source 108 is operatively coupled to switches 70 and 72, which, when either is closed, will provide a current through the solenoid 106. Again, as mentioned hereinabove, each switch 70 and 72 is oppositely wired or polarized so that current through one will cause motor 44 to engage linear actuator forwardly and current through the other, being of an opposite sort, will cause motor 44 to engage linear actuator 26 in the opposite direction or in retraction. Therefore, after current flows through a closed switch 70 or 72, solenoid or brake 106 will receive that current and disengage its braking means and allow current to then flow and engage motor 44. Thereafter, motor 44, which is operatively coupled to linear actuator 26, will cause linear actuator 26 to extend or retract depending on which type of current it receives from switch 70 or switch 72. Of course, as described hereinabove, track switch left 70 or track switch right 72 are engaged or closed, thereby allowing current to flow therethrough by movement of knob 38 and pointer 36, and therefore gantry 90 along rail 92 within housing 30. As linear actuator 26 extends or retracts, likewise as depicted in FIG. 9, track rail 92 will also extend or retract until switch 70 or 72, whichever is in a closed position, reaches rest area 88, thereby causing both switches to again be in an open position. As described above, once those switches are both again in their rest or open position, current no longer flows through solenoid 106 and its electromechanical braking thereafter takes effect.

In use and operation, a user would by hand grasp knob 38 and move pointer 36 along scale 40 a desired distance to so move stops 24 that same desired distance and direction. As can now be understood, within seconds, stops 24 can be moved the entire length of scale 40. Of course, longer guide rails can be provided for longer tables and shorter guide rails can be provided for shorter tables, but it is preferred that the guide rail be at least ten feet long as a standard industry practice. It is also preferred that the stops be spaced a foot apart, at least initially. Once the stops are set in the position that the user desires, a workpiece, or board, is abutted against the desired stop for the desired length to be cut. That is, if a four foot, six inch, cut is desired, the knob would have been moved six inches to the left, causing the stops to move six inches to the left, and the user would abut the workpiece against the fourth stop, assuming the first stop is one foot from the saw blade in a normal, initial position. By abutting the workpiece against the fourth stop, the first three stops pivot to a vertical position to thereby get out of the way of the workpiece. Thereafter, while the workpiece is now lying beneath the saw blade, the saw 12 is pivoted downward in cutting engagement with the workpiece, hence severing it to form a four foot, six inch length, or whatever other length might be desired.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A device for cutting an article to length, comprising, in combination:

a work table upon which the article is supported;

a saw mounted on said table;

a guide rail supported on said work table;

a plurality of stops coupled to said guide rail, one of said stops to position the article relative to said saw, said guide rail being axially movable on said work table;

said guide rail coupled to linear translation means;

said linear translation means operatively coupled to a pointer such that linear motion of said pointer causes motion of said stops and said guide rail and said linear translation means with respect to said saw.

2. The device of claim 1 wherein said pointer is coupled to a pair of switches, a first said switch in effect subtracting length with respect to said saw, a second said switch adding length with respect to said saw;

one said switch causing motion of said linear translation means upon corresponding motion of said pointer.

3. The device of claim 2 wherein said pointer registers with a scale and said scale is calibrated to correlate with a distance between adjacent stops.

4. The device of claim 3 further including switch guides, one for each said switch, wherein each said switch includes a contact which, when coupled to a respective said switch guide moves said one of said stops and said guide rail and said linear translation means.

5. The device of claim 4 including a rest area between said switch guides.

6. The device of claim 5 wherein said linear translation means includes a motor enabled by only one of said switches at a time when one said switch is engaged, said motor is energized to move said guide rail by a rod arm, said rod arm also coupled to a rod which moves a rail and said switch guides until said rest area is located, corresponding to a pointer setting whereupon said one said engaged switch is disengaged.

7. The device of claim 6 wherein said switch guides are axially offset from each other and said switches are on opposite sides of said switch guides so that only one switch is enabled at a time.

8. The device of claim 7 including a brake means operatively coupled to said linear translation means, said brake means engaged when said motor is idle, thereby holding said stops in fixed position.

9. The device of claim 8 wherein said stops are pivotally coupled to said guide rail to retract said stops along the length of the article, while leaving one said stop to abut the article corresponding to a desired length set by said pointer.

10. The device of claim 9 wherein said switches are supported on a gantry, said gantry slideably coupled to said rail, said gantry supporting said pointer, whereby movement of said pointer with respect to said scale causes movement of said gantry and switches along said rail.

11. The device of claim 10 wherein an air hose feeds air onto said switches to prevent debris from contaminating said switches.

* * * * *